3,518,272
TETRAHYDRO BENZOPYRANOQUINOLINES AND
PROCESS FOR THEIR PRODUCTION
Max von Strandtmann, Rockaway, Marvin P. Cohen, New
Milford, and John Shavel, Jr., Mendham, N.J., assignors
to Warner-Lambert Pharmaceutical Company, Morris
Plains, N.J., a corporation of Delaware
No Drawing. Filed Feb. 5, 1968, Ser. No. 702,770
Int. Cl. C07d 39/00
U.S. Cl. 260—286                                    4 Claims

ABSTRACT OF THE DISCLOSURE

Pyran derivatives of type I are disclosed:

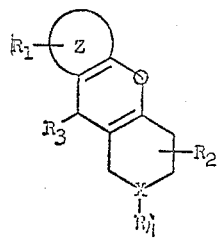

(I)

wherein Z is an aromatic or heteroaromatic nucleus; X is CH, N, S; $R_1$ is hydrogen, halogen, nitro, hydroxy, lower alkoxy, carboalkoxy, lower alkyl, aryl, aralkyl and various amino substituents; $R_2$ and $R_3$ are hydrogen, lower alkyl, cycloalkyl, aryl, aralkyl; $R_4$ is hydrogen, oxygen, lower alkyl, aralkyl, aryl or acyl. Certain of the compounds where X is sulfur may be without an $R_4$ substituent.

These compounds are useful as central nervous system stimulants.

---

The present invention relates to certain polycyclic pyran derivatives which may be represented by the formula below:

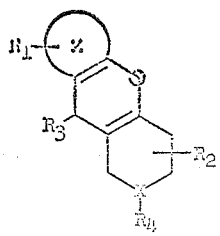

(I)

wherein Z is an aromatic or heteroaromatic nucleus such as benzene, naphthalene, phenanthrene, pyridine, quinoline, isoquinoline, carbazole, or indole; X is N, S, CH; $R_1$ is hydrogen, halogen, nitro, hydroxy, lower alkoxy, carboalkoxy, amino, dialkylamino, alkylamino, lower alkyl, aryl or aralkyl; $R_2$ and $R_3$ are hydrogen, lower alkyl, cycloalkyl, aryl or aralkyl; $R_4$ is hydrogen, lower alkyl, aryl, acyl or aralkyl, and in cases were X=S, $R_4$ is either nonexistent or oxygen.

In the above definitions for $R_1$, $R_2$, $R_3$ and $R_4$, lower alkyl and a lower alkyl portion of lower alkoxy and aralkyl are meant to include from 1–6 carbon atoms, such as methyl, ethyl, propyl, isopropyl and the like. Halogen is meant to include all four members of its family, i.e. chlorine, bromine, fluorine and iodine. Aryl is meant to include an aromatic nucleus such as benzene, as well as a heterocyclic nucleus such as pyridine, quinoline, isoquinoline and the like. Cycloalkyl is meant to include from 3–8 carbon atoms. Acyl is meant to include a radical derived from a lower alkanoyl acid, e.g. acetyl, propionyl, and the like, and benzoyl.

Pyrans of this invention are prepared by dehydration of corresponding compounds of type II having a hydroxyl group.

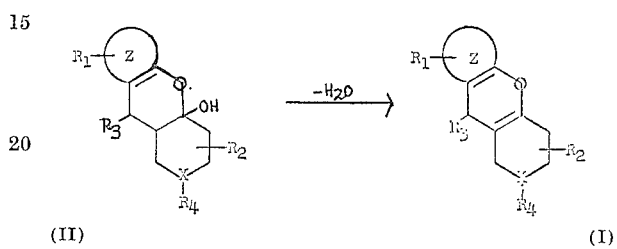

(II)                                    (I)

The dehydration is carried out by heating compounds of type II in the presence of dehydrating agents or by heating the salts of the basic compounds of type II above their melting point.

The preparation of compounds of type II is described in our copending application, Ser. Nos. 561,071, 636,671 and 569,832.

The compounds of this invention are useful as central nervous system stimulants. For example, at a dose of about 10–50 mg./kg. orally, the above compounds exhibit strong central nervous system stimulant effects in mammals such as mice, cats, dogs, monkeys and the like. Accordingly, these compounds are indicated in conditions associated with depressive states by restoring alertness.

Generally speaking, a dose of about 10–50 mg./kg. body weight of the mammal to be treated is prescribed to produce the desired stimulant effect. This dosage may be repeated several times daily and typically 2 to 3 times daily. The above described dosage regimen may be varied according to individual variations in body weight and according to the species of the mammal being treated by methods well known to the healing arts.

The basic compounds of this invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate.

The following examples are included in order further to illustrate the invention.

EXAMPLE 1

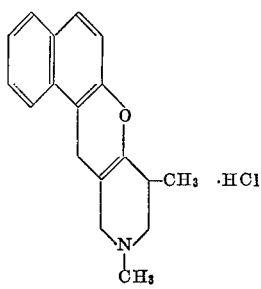

9,10,11,12-tetrahydro-8,10-dimethyl-8H-naphtho[1',2':5,6]pyrano[3,2-c]pyridine hydrochloride 4 g. of 8,9.10.11,11a,12-hexahydro-8,10-dimethyl-7aH-naphtho[1',2':5,6]pyrano[3,2-c] - pyridin - 7a-ol-hydrochloride was heated at ca. 250° for 5 min. The material melted, and resolidified. It was recrystallized from methanol, M.P. 303–06°; yield 1.2 g. (32%); λ max. mu (ε) 215 (53,500), 219 (55,000), 244 (23,200), 280 (23,400), 281 (4,100), 319 (1,280), 335 (1,600); $\gamma_{max.}$ 770 (m.), 990 (m.w.), 1040 (m.w.), 1110 (m.), 1235 (s.), 1605 (w.), 1625 (m.w.), 1720 (m.w.), cm.$^{-1}$.

Analysis.—Calcd. for $C_{18}H_{19}NO \cdot HCl$ (percent): C, 71.63; H, 6.68; N, 4.64; Cl, 11.75. Found (percent): C, 71.88; H, 6.67; N, 4.63; Cl, 11.89.

The $LD_{50}$ in mice was found to be about 180 mg./kg. orally.

EXAMPLE 2

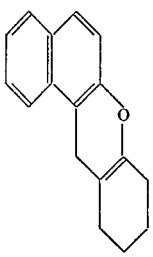

8,9,10,11-tetrahydro-12H-benzo[a]xanthene

The solution of 5 g. of 8,9,10,11,11a,12-hexahydro-7aH-benzo[a]xanthen-7a-ol and 5 g. of anhydrous sodium acetate in 50 ml. of glacial acetic acid was refluxed for 5 hrs., and poured into an ice-water mixture. The precipitate was filtered off, washed with water and recrystallized from ethanol, M.P. 92.5–95°; yield: 3.7 g. (79%): λ max. mu (ε) 215 (46,000), 219 (51,000), 244 (19,400), 283 (4,000), 322 (1,600), 336 (1,700); $\gamma_{max.}$ 755 (m.) 810 (m.), 1120 (m.), 1195 (m.s.), 1220 (m.s.), 1515 (m.w.), 1605 (m.), 1625 (m.w.), 1730 (m.w.) cm.$^{-1}$.

Analysis.—Calcd. for $C_{17}H_{16}O$ (percent): C, 86.40; H, 6.83. Found (percent): C, 86.53; H, 6.94.

The $LD_{50}$ in mice was found to be greater than 1,000 mg./kg. orally.

EXAMPLE 3

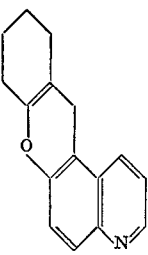

9,10,11,12-tetrahydro-8H[1]benzopyrano[3,2-f]quinoline

This compound was prepared in analogous fashion to 8,9,10,11-tetrahydro-12H-benzo[a]xanthene from 5 g. of 8,9,10,11,11a,12 - hexahydro - 7aH[1]benzopyrano[3,2-f] quinolin-7a-ol, M.P. 130–32°; yield: 3 g. (63%); λ max. mu (ε) 254 (19,700), 336 (2,880); $\gamma_{max.}$ 800 (m.s.), 835 (m.s.), 1110 (m.), 1190 (m.), 1230 (m.), 1500 (m.), 1615 (m.w.), 1710 (m.w.) cm.$^{-1}$.

Analysis.—Calcd. for $C_{16}H_{15}NO$ (percent): C, 80.98; H, 6.37; N, 5.90. Found (percent): C, 81.09; H, 6.37; N, 5.80.

The $LD_{50}$ in mice was found the be greater than 1,000 mg./kg. orally.

EXAMPLE 4

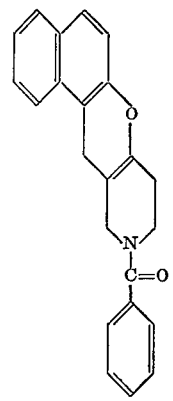

10-benzoyl-9,10,11,12-tetrahydro-8H-naphtho[1',2':5,6]pyrano[3,2-c]pyridine

This compound was prepared in analogous fashion to 8,9,10,11-tetrahydro-12H-benzo[a]xanthene from 5 g. of 10 - benzoyl-8,9,10,11,11a,12-hexahydro - 7aH - naphtho[1',2':5,6]pyrano[3,2-c]pyridin-7a-ol, M.P. 152–53°; yield: 2 g. (42%); λmax. mu (ε) 214 (50,200), 218 (51,300), 242 (23,900), 249 (24,400), 281 (3,540), 292 (2,160), 317 (1,050), 332 (1,220); $\gamma_{max.}$ 690 (m.s.), 795 (m.), 1105 (m.), 1230 (m.s.), 1600 (m.w.), 1635 (m.s.), 1725 (m.w.) cm.$^{-1}$.

Analysis.—Calcd. for $C_{23}H_{19}NO_2$ (percent): C, 80.91; H, 5.61; N, 4.10. Found (percent): C, 80.62; H, 5.63; N, 3.90.

The $LD_{50}$ in mice was found to be greater than 1,000 mg./kg. orally.

It is understood that the foregoing detailed description is given merely by way of illustration and that many variations may be made therein without departing from the spirit of our invention.

Having described our invention, what we desire to secure by Letters Patent is:

1. A compound of the formula

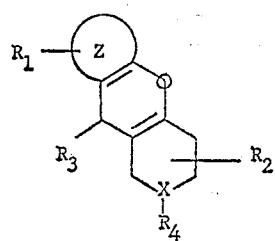

(I)

wherein Z is quinoline or isoquinoline; X is N, S, CH; $R_1$ is hydrogen, halogen, nitro, lower alkoxy, hydroxy, carbolower alkoxy, amino, diloweralkylamino, lower alkylamino, lower alkyl, phenyl, phenyl lower alkyl; $R_2$ and $R_3$ are hydrogen, lower alkyl, cycloalkyl of 3 to 8 carbon atoms, phenyl, phenyl lower alkyl; $R_4$ is hydrogen, lower alkyl, phenyl, phenyl lower alkyl, or acyl of a lower alkanoyl acid and benzoyl, and in cases where X=S, $R_4$ is either nonexistent or oxygen; and when X is N, the corresponding non-toxic pharmaceutically acceptable acid addition salts and quaternary ammonium salts.

2. A compound of claim 1 which is 9,10,11,12-tetrahydro-8H[1]benzopyrano[3,2-f]quinoline.

3. A process for the production of a compound of claim 1 which comprises heating a compound of the formula:

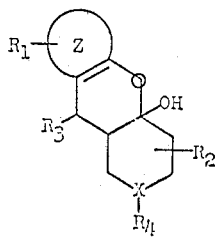

(II)

above its melting point.

4. A method according to claim 3 wherein starting compound II, when X is N, is employed in the form of its salt.

References Cited

UNITED STATES PATENTS

| | | | |
|---|---|---|---|
| 2,723,268 | 11/1955 | Henecka | 260—289 X |
| 3,121,086 | 2/1964 | Sartori | 260—286 |
| 3,192,204 | 6/1965 | Craig et al. | 260—294.7 X |
| 3,317,527 | 5/1967 | Skaletzky | 260—268 X |
| 3,325,489 | 6/1967 | Boluer | 260—268 X |
| 3,396,166 | 8/1968 | Boluer | 260—268 X |

OTHER REFERENCES

Ahusa: Abstracted in Chem. Abstr., vol. 45, col. 6206–7 (1951).

Von Strandtmann: Abstracted in Chem. Abstr., vol. 63, col. 18059.

Von Strandtmann et al., Tetrahedron Letters, No. 35, pp. 3103–6 (1965).

DONALD G. DAUS, Primary Examiner

U.S. Cl. X.R.

260—289, 345.2, 315, 335, 297, 287, 295, 326.16; 424—258